March 30, 1954  S. H. SMITH  2,673,542
METHOD OF MAKING EXCHANGER CORE TUBES
Filed Feb. 4, 1949
4 Sheets-Sheet 1
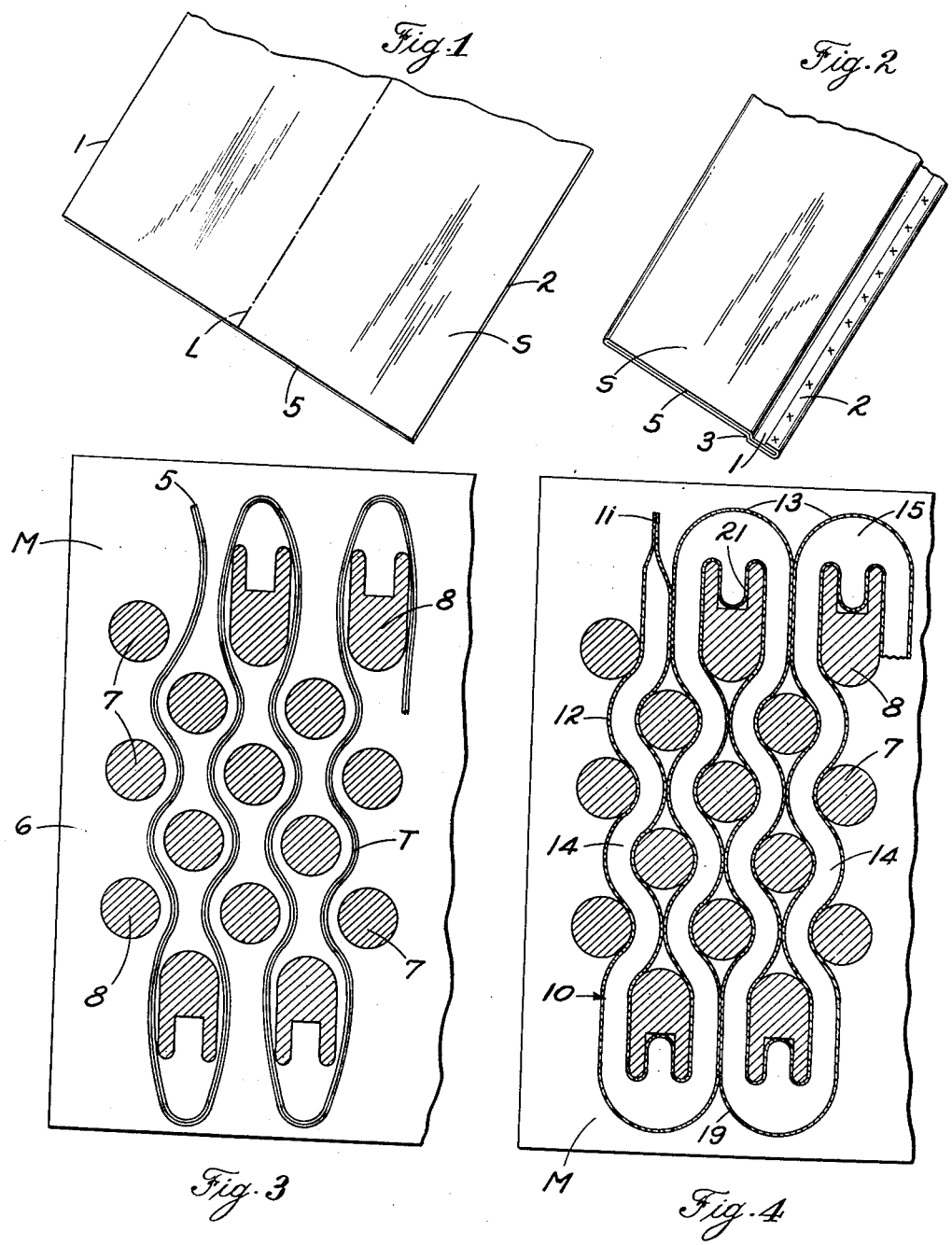
INVENTOR.
SAMUEL H. SMITH
BY
ATTORNEYS March 30, 1954  S. H. SMITH  2,673,542
METHOD OF MAKING EXCHANGER CORE TUBES
Filed Feb. 4, 1949  4 Sheets-Sheet 2

INVENTOR.
SAMUEL H. SMITH
BY Richey & Watts
ATTORNEYS

March 30, 1954 — S. H. SMITH — 2,673,542
METHOD OF MAKING EXCHANGER CORE TUBES
Filed Feb. 4, 1949 — 4 Sheets-Sheet 3
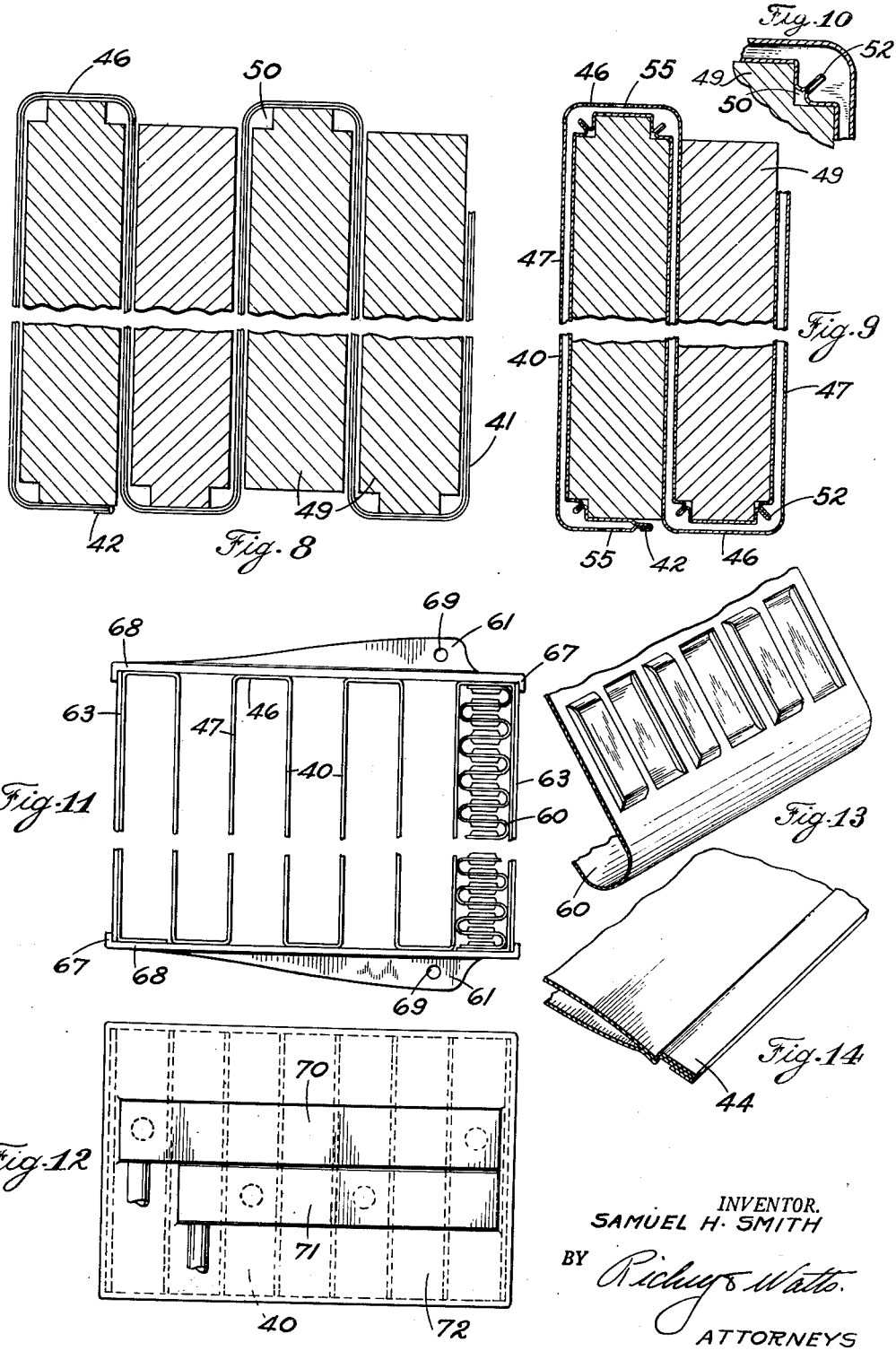
INVENTOR.
SAMUEL H. SMITH
BY Richey & Watts
ATTORNEYS

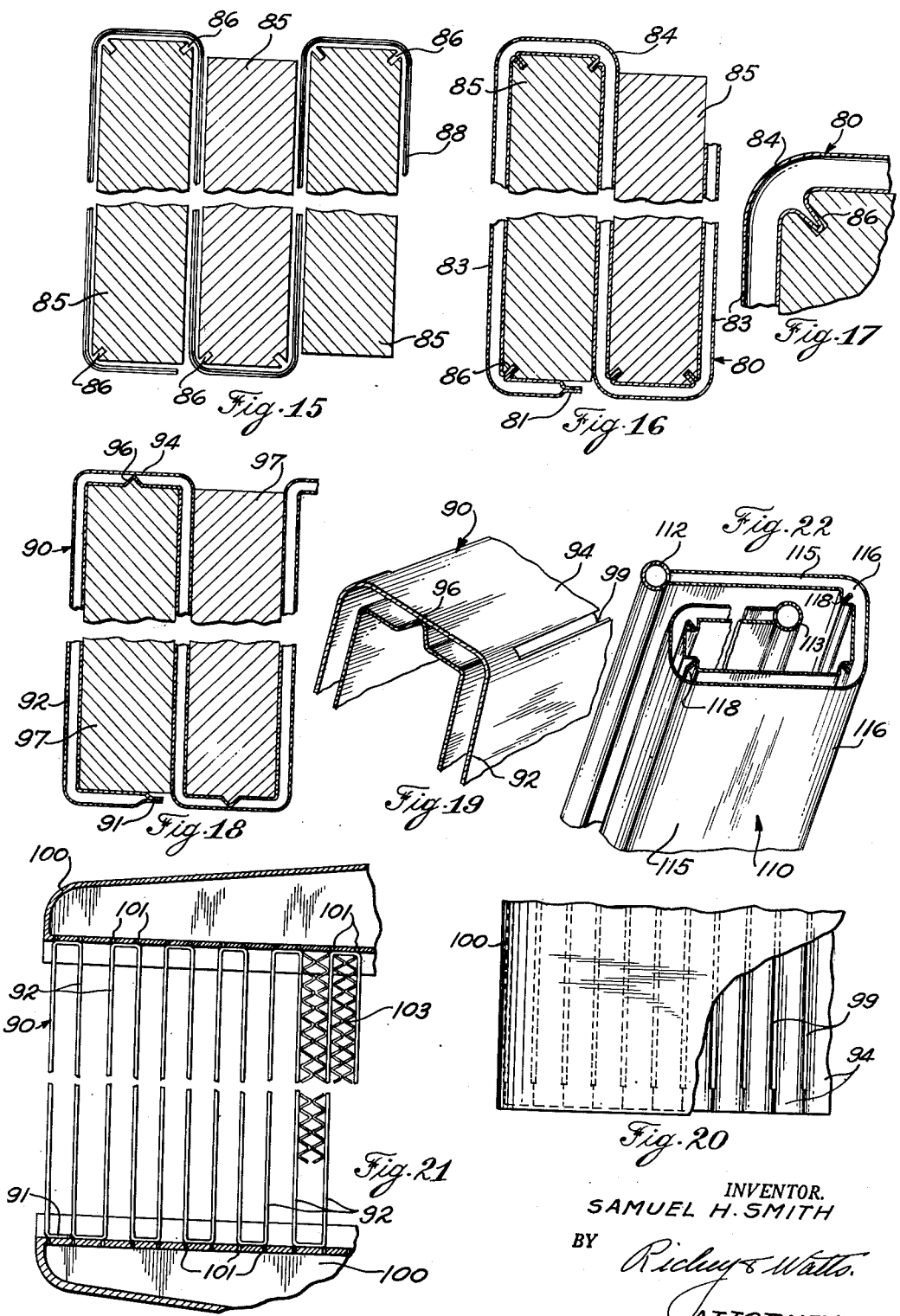

Patented Mar. 30, 1954

2,673,542

UNITED STATES PATENT OFFICE 2,673,542

METHOD OF MAKING HEAT EXCHANGER CORE TUBES

Samuel H. Smith, Cleveland, Ohio

Application February 4, 1949, Serial No. 74,572

10 Claims. (Cl. 113—118)

The present invention relates generally to the heat exchanger art and is more particularly concerned with a very economical and useful heat exchanger of novel design and construction, and with a unique method of making automobile heaters and radiators and other heat exchange devices.

Although this art is relatively old and highly developed, it still contains important unsolved problems, an outstanding example of which is the matter of substantially simplifying automobile heaters and radiators. A typical present-day automobile heater, for instance, comprises a core of complex construction having 20 or more water tubes soldered or otherwise secured independently at their ends to headers or tanks. Additionally, fins of sheet metal are provided between adjacent tubes and soldered thereto. The ordinary tube of this core is made of two sheets of thin metal embossed at various places to assure a passageway for fluid and soldered together along their edges. Mass production techniques which have been developed to some degree to increase the rate of production of these devices have served to emphasize their undesirable complexity and the need for a radically different design and construction. Although those skilled in the art have thus long been aware of this problem and need, they have hitherto completely failed to produce a satisfactory answer.

In accordance with my present invention, heat exchangers in general, and automobile radiators and heaters in particular, can now, for the first time to my knowledge, be made with only one core tube. Consequently, one part, consisting preferably of one piece, can be substituted for 20 or more parts, consisting preferably of two pieces each. Furthermore this substitution can be made without the loss of heat exchange efficiency or capacity, while eliminating considerable metal and weight from the final core of the heater or radiator as a whole. Also by virtue of this invention, the single soldering, welding or brazing operation required in making the present core tube is, by comparison with the very numerous joining operations of the prior art, very simple and easy to carry out. An incidental, but nevertheless important, result of thus eliminating solder joints and soldering operations is the very considerable reduction in the number of core tube failures in test and use.

This invention is predicated upon my surprising discovery that a metal tube of good strength and heat conducting properties can be made rapidly and economically from thin sheet metal stock such as copper, aluminum and stainless steel, and can be shaped as a heater or radiator core without stretching or weakening to any appreciable extent, although a number of very sharp bends may be required in the forming operation. The tubes made in this manner may define continuous fluid passageways from end to end for free fluid flow through the tube to accomplish the heat exchange results desired in an automobile heater core, for instance. Alternatively, they may define a number of separate passageways for fluid flow according to the usual design in automobile radiator cores. Thus cores made with these tubes can be interchangeable with the heretofore conventional cores and serve as replacement as well as original parts. As a still further advantage of this invention, where fins are employed in making the final core construction, it is possible to combine in one operation the steps of finally shaping the tubes, fastening the fins and tubes together, and testing the tubes for fluid tightness.

The important differences between the prior art devices and those of this invention, and the further advantages of my core tubes and heaters and radiators embodying them will be more apparent when it is considered that in general these tubes are characterized by having a plurality of substantially parallel, hollow, elongated portions, relatively short bend portions between adjacent elongated portions, and inlet and outlet ports in said bend portions which communicate with each other through the elongated portions. Two principal types of tubes of this invention fall within this general description, i. e. those in which the short bend portions have fluid passageways, communicating with the passageways in the elongated portions, and those in which the passageways in the said elongated portions are substantially separate from each other by virtue of the presence of constriction means in the bend portions.

The present method in brief comprises the steps of bending a metal sheet and bringing two opposite edges thereof near to each other, securing fluid-tightly together opposed portions of the sheet adjacent to these edges and thus forming a collapsed tubular body, bending the body through an angle, expanding this body into a predetermined form by applying pressure internally of the body. In making the continuous passageway tube, this method involves the further step of simultaneously moving a portion of the body inner wall away from the outer wall at the bend. But where it is desired that the tube define a plurality of separate and independent passageways, the method includes the step of moving a part of this inner wall at the inside of the bend toward the outer wall so that the fluid passageway through each bend is constricted or preferably substantially closed between its ends.

In the drawings accompanying and forming a part of this specification:

Fig. 1 is a fragmentary perspective view of a thin metal sheet to be used in making a tubular body representing one form of this invention;

Fig. 2 is a fragmentary perspective view of the sheet of Fig. 1 after its conversion into a tubular body, as described above;

Fig. 3 is a fragmentary plan view of the sheet of Fig. 1 after it has been bent into generally final shape and fitted to the mold;

Fig. 4 is a view similar to Fig. 3 but with the tube inflated into the shape of the desired core tube;

Fig. 8 is a fragmentary, horizontal sectional view of a collapsed sheet metal tube disposed in another type of sheet metal mold;

Fig. 9 is a view similar to Fig. 8, showing only a portion of the mold and tube therein with the tube inflated to generally the shape finally desired in the heater core being made;

Fig. 10 is an enlarged sectional view showing the conformation of the metal tube at one typical corner or bend section, indicating how the metal wall at the inside of the corner has been deformed during the expansion operation;

Fig. 11 is a front elevational view of an automobile heater of this invention having a tubular body of the type shown in Figs. 8 and 9 with fins disposed between opposed elongated portions of the said body;

Fig. 12 is a top plan view of another car heater embodying this invention, parts being broken away to show the relationship of the tanks to the fins and tube of the core;

Fig. 13 is an enlarged perspective view of a preferred type of fin as shown in Fig. 11;

Fig. 14 is an enlarged fragmentary view of a portion of tube of Fig. 8 at the soldered joint showing the locked construction of the joint;

Fig. 15 is a view like Fig. 8, but showing mold blocks of different form and effect;

Fig. 16 is a view like Fig. 15, showing the core tube inflated to the desired shape;

Fig. 17 is an enlarged cross-sectional view of the tube of Fig. 16, illustrating how the excess metal of the inner wall of the tube is accommodated in the inflation operation;

Figure 5:
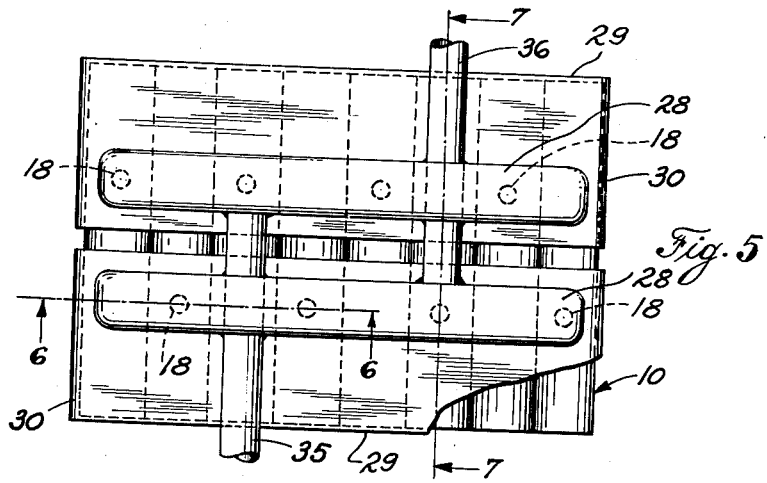
Fig. 5 is a fragmentary side elevational view of a heater of this invention including a tank fastened to the top of the core tube of Fig. 4.

Fig. 18 again is a view like Fig. 8 but showing still another type of mold block and showing the tubular body expanded and formed in the mold;

Fig. 19 is an enlarged, fragmentary perspective view of a bend portion of the tube of Fig. 18;

Fig. 20 is a plan view of a typical automobile radiator with part of the tank broken away;

Fig. 21 is a fragmentary face view of the radiator of Fig. 20, and

Fig. 22 is a perspective view of another core tube of this invention.

Referring to Fig. 4, a typical core tube 10 of my invention has two end portions 11 (one shown) sealed against fluid flow therethrough, and a plurality of elongated, corrugated and juxtaposed portions 12 connected to relatively short bend portions 13 defining arcs of substantially 180°. Since tube 10 is hollow, a continuous, but somewhat tortuous, fluid passageway is defined from end to end thereof, passageways 14 in adjacent portions 12 communicating with each other through passageways 15 in bends 13. Ports 18 (Figs. 6 and 7) are cut at predetermined places in outer walls 19 of the bends for delivery of water or the like into tube 10 and removal of said water therefrom, and a portion 21 of the inner wall at each said bend is disposed inwardly of the tubular body and away from opposing portions of outer wall 19 to assure a continuous free passageway extending substantially the length of the tube. Thus passageways 15 are enlarged in cross-section in part at least, while the passageways 14 are of substantially uniform cross-sectional size and shape throughout. Outer walls 19 of the bend portions bear against opposing portions of the outer walls of adjacent bends thereby closing the core tube transversely at top and bottom. The corrugations in adjacent portions 12 are so related as to assure engagement of said portions at spaced points whereby a beam effect is obtained to strengthen the resulting core and a plurality of separate transversely extending passages 25 for air flow through the core are defined between said top and bottom sections.

Figure 6:
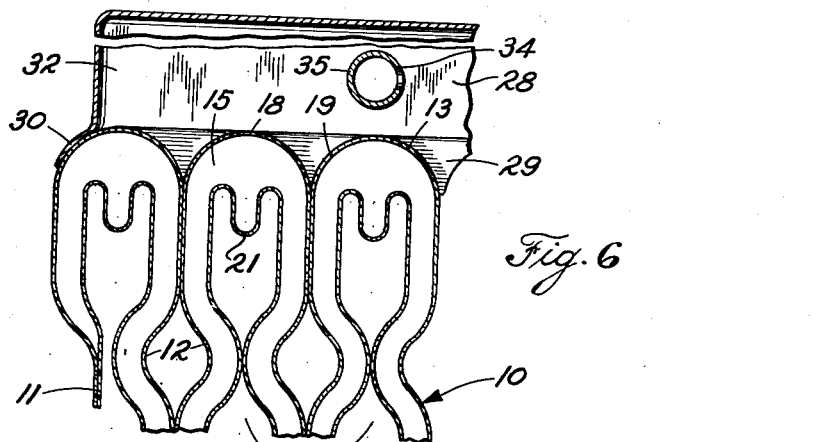
Fig. 6 is a fragmentary end elevational view of the device of Fig. 5.
Figure 7:
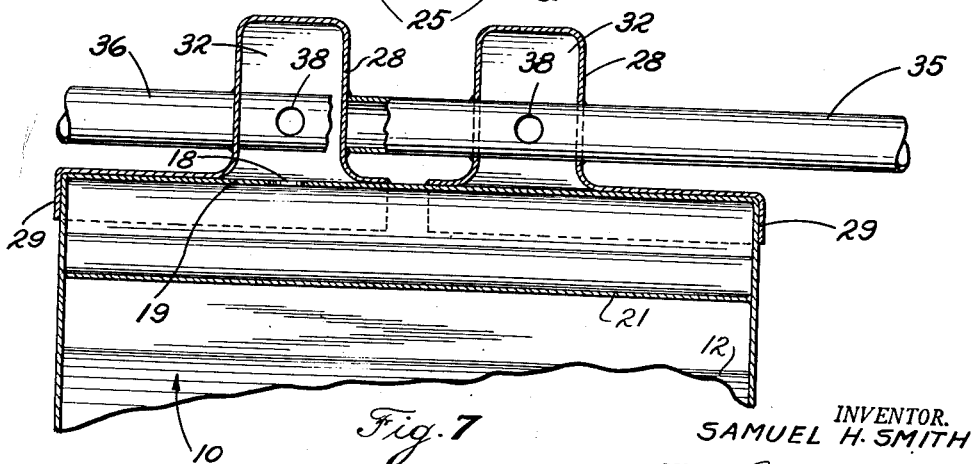
Fig. 7 is a plan view of the device of Figs. 5 and 6 with a portion of the tank broken away to show the shape and construction of the upper side of the core.

The incorporation of tube 10 into an automobile heater organization is illustrated in Figs. 5, 6 and 7, wherein two separate headers or tanks 28 are shown attached to the top side of tube 10, escalloped skirts or edges 29 of headers 28 being soldered or otherwise fluid tightly fastened to outer walls 19 at their ends and at two places between said ends. Headers 28 are also provided with flange-like portions 30 at their ends which are secured to said walls 19 near the ends of tube 10 by means of solder or the like. Preferably these headers are formed from a single sheet of metal, a longitudinally extending, relatively deep recess 32 being provided to distribute water to, and collect it from the various ports 18, one of the headers thus serving one group of ports and the other serving the second group (Fig. 5). A pair of registered apertures 34 are provided in each header to receive a water delivery or withdrawal pipe 35 or 36, said pipes thus extending through recesses 32 in each case and being secured fluid-tightly not only to the tank they serve but to the other tank as well. A port 38 is provided in the side wall portion of pipes 35 and 36 disposed in the recesses.

Tube 10 is made in accordance with the method described above from a long, relatively wide metal sheet S of suitable thickness, as about 4 thousandths of an inch. After bending sheet S substantially along its longitudinal center line L and bringing one side edge 1 adjacent to but not even with the other edge 2, edge 2 is lapped over the edge 1 the full length of the sheet and the two are crimped together as indicated at 3 and then tightly fastened together as by soldering, brazing or welding. Ends 5 of sheet S may also be soldered or otherwise secured together as indicated to define a collapsed sealed tube T, or they may be left open, depending on the manner in which the subsequent inflation step is to be carried out. Tube T is laced through a mold or forming box M comprising a base plate 6 provided with a plurality of apertures arranged in a predetermined manner, and a number of cylindrical pegs 7 having reduced lower end portions to be received in said apertures, and other pegs 8 having grooved outer edges and reduced lower extremities received in supporting engagement in plate 6. A pair of restraining plates (not shown) are fastened to plate 6 and extend upwardly therefrom to engage the end portions of tube T and limit displacement of its outer wall. With the tube in place in mold M (Fig. 3) air is introduced into the tube adjacent to one of its ends by means of a hose or pipe (not shown) which is attached in any suitable manner to the tube. The rate of air flow into the tube is preferably controlled so that undue stresses are not developed in the tube and stretching or breaking of the tube is avoided.

When the inflation step is finished, the air pressure in the resulting tube 10 is reduced by disconnecting the air line from the tube and said tube is removed from mold M. Ports 18 are then cut in a predetermined pattern and tanks 28 are attached and fluid-tightly secured to the tube as shown in Fig. 5. With the opening through which the inflating air was charged into the tube, sealed pipes 35 and 36 may be connected into the cooling system of an automobile in the usual way and the air delivery line and return baffle (not shown) may be attached as is customary and the heater is ready for use.

Referring now particularly to Figs. 8 to 14, inclusive, core tube 40 therein illustrated comprises a single sheet of metal of the thickness indicated above, made generally as described above in the form of a collapsed tube 41 (Fig. 8) closed at its ends, as shown at 42, and lapped and crimped along its edges 44 (Fig. 14) to prevent interference with the inflation step because of undue solder penetration into the tube when these lapped edges are bonded together. Tube 40, unlike tube 10, has bend portions 46 defining two, spaced, substantially 90° angles connecting adjacent, hollow, elongated but non-corrugated portions 47. To take care of the excess metal in the inner wall of tube 40 at bends 46 mold blocks 49 are formed with right angle grooves 50 in the corners of their forming faces and the said excess metal is pushed into these grooves under internally applied pressure to define generally W-shapes in transverse cross-section. The tangs 52 resulting from this deformation of the inner walls do not constitute constriction means in the continuous passageway through the tube and water circulation can therefore occur in the final heater as above described, ports 55 being provided in bends 46 as desired.

A typical heater construction including core tube 40 comprises in addition to the said tube, a plurality of fins 60 of relatively thin sheet metal as, for example, about four or five thousandths inch thickness, and a pair of headers 61 (Fig. 11) tapered for clearance and disposed at the top and bottom of tube 40. Retaining and stiffening plates 63 are also provided and cover the tube ends. Fins 60 are made of sheeting of substantially the same width as tube 40 in order that air being moved through the core will be guided throughout its travel therein by the fins. The said sheet is bent into serpentine form after being partially punched out in a plurality of places to provide air flow deflection means and then is put into the space between a pair of long portions 47. With the tube 40 coated with solder or the like and sealed, the assembly of fins and the tube is heated to soften the solder and expand the tube into engagement with the fin sheets at each bend in said sheets. Preferably the solder used to coat the tube and attach the fins is of substantially lower melting point temperature than the solder used to seal the tube, so that there will be no danger of breaking the seals during the fin-securing operation.

Plates 63 have relatively short flanges to fit over or grip the vertical edges of tube 40, and the plates, themselves, are held in place by means of flanges 67 on header plates 68 which also grip the ends of bend portions 46. Plates 68 are apertured in any desired way, for instance as is illustrated in Fig. 11, and header tanks are fluid-tightly joined to plates 68 to cover all such apertures. Water pipes are connected to headers 61 in the usual way, ports 69 being provided in the tanks for the purpose.

The Fig. 12 assembly differs from that of Fig. 11 primarily in that two headers 70 and 71 are provided at the top of the heater, and instead of a separate bottom retaining element, the side retaining means are integrally formed to define a bottom portion as well as the side portions and the single body is locked in position by a flanged header plate 72 as described.

Still another type of core tube is shown in Figs. 16 and 17, wherein tube 80 has sealed end portions 81 elongated, substantially straight and parallel hollow portions 83, and bend portions 84 extending between and communicatively connecting adjacent and juxtaposed portions 83. The essential difference between tubes 40 and 80, therefore, is in the detail of the conformation of the inner wall in the bend sections, said wall being of generally V-shape in transverse cross-section in the corner sections of tube 80. To obtain this shape mold blocks 85 are provided with slots 86 extending at substantially 45° into their tube-shaping corner sections. It will be appreciated that despite this difference in the two tubes, tube 80 may be used to the same manner and to the same effect as tube 40, and that the method of making tube 80 can be generally the same as described above, a collapsed tubular body 88 sealed at its ends being inflated in a mold by means of air under pressure. Likewise, ports (not shown) may be provided in tube 80.

In tube 90 shown in Figs. 18 and 19, end portions 91 are again sealed and elongated, hollow juxtaposed and parallel portions 92 are connected by relatively short bend portions 94 defining two substantially 90° arcs. However, instead of the passageways in adjacent portions 92 being connected through bends 94, the inner wall of each bend is pushed at one place out of shape and into engagement with the opposing surface of the outer wall, as at 96. The contact between the said inner and outer walls in the bends may be such that little or no fluid flow will occur through the bends. The mold blocks 97 are shaped to produce the desired partial or complete sealing effect, having an upstanding, longitudinally extending rib in each instance disposed approximately midway between the sides of the block. Slot-like ports 99 are provided in each bend portion after the tube has been inflated, generally as described above, so that when fitted with upper and lower header tanks 100 (Fig. 21) of a conventional automobile radiator, the portions 92 will serve as individual water courses and function to the same effect as the entirely separate water tubes of the previously known radiator cores. Header plates 101 are apertured as required for registry with ports 99 and the tube is attached to the headers by means of solder or the equivalent. Fins 103 of a conventional design may be incorporated in the present core in any desired manner, for instance, as described above wherein the tube is inflated a second time by means of heated air sealed in the tube during the solder coat softening operation.

In Fig. 22 a tube 110 of generally rectangular spiral shape (in end view) is shown associated with an inlet header 112 and an outlet header 113 both of which are of generally tubular shape and fluid-tightly secured to the open ends of tube 110. This tube is of the continuous water course type, comprising elongated, hollow portions 115 and relatively short, hollow bend portions 116 communicatively connecting said portions 115. The inner wall of the tube is disposed apart from the outer wall at each bend and folded to define tangs 118 as described in reference to the tube of Fig. 9, the passageway through the tube thus being enlarged in a portion at least of each bend section. Again, the formation of tube 110 is preferably carried out as described above, starting with a thin sheet of metal S but adding the step of opening the ends of the tubular body after the inflation step to enable attachment of headers 112 and 113.

Having thus described the present invention so that those skilled in the art may be able to understand and practice the same, I state that what I desire to secure by Letters Patent is defined in what is claimed.

What is claimed is:

1. The method of making a heat exchanger core tube which comprises the steps of bringing the opposed edges of a metallic strip together, joining the edges to produce a substantially collapsed fluid-tight tube, bending the tube about a line passing through the lateral extremity of the tube and disposing the bent tube about a die block having a relatively deep recessed portion adjacent the place where the tube is bent, and then expanding the tube by fluid under pressure to separate the walls of the tube and force the excess metal of the inner wall of the tube adjacent the block into the recessed portion so that the expanded tube is unconstricted at the bend.

2. The method of making a heat exchanger core tube which comprises the steps of folding a flat metallic strip to bring the longitudinal edges together, joining the edges to produce a substantially collapsed fluid-tight tube, disposing the said collapsed tube in a serpentine path about a plurality of die blocks, the die blocks at the bends each having a relatively deep recessed portion adjacent the bend made by the tube in passing about the outer extremity thereof and then expanding the tube by fluid pressure to separate the walls of the tube and force the excess metal of the inner wall of the tube adjacent the blocks into the recessed portions thereof so that the expanded tube is unconstricted at the bend.

3. The method of making a heat exchanger core tube which comprises the steps of folding a metal sheet lengthwise and bringing the two opposite edges thereof near to each other, permanently securing together opposed portions of the sheet adjacent to said edges to form a substantially flat tubular body, disposing in predetermined space relation a plurality of generally rectangular die blocks having relatively deep recesses across their corner portions, threading the tubular body into a serpentine configuration through the resulting die block assembly, introducing fluid under pressure into said body and thereby expanding the body to simultaneously move the flat sides of the body into engagement with opposing side walls of adjacent die blocks and to move the excess portion of the inner wall of the body at each bend away from the opposing outer wall portion and into the recessed portions thereof so that the expanded tube is unconstricted at the bend.

4. The method of making a heat exchanger core tube which comprises the steps of bringing the opposed edges of a metallic strip together, joining the edges to produce a substantially collapsed fluid-tight tube having a seam at a lateral extremity thereof, bending the tube about a line passing through the longitudinal center line of the tube seam and disposing the bent tube about a die block having a relatively deep recessed portion adjacent the place where the tube is bent, and then expanding the tube by fluid under pressure to separate the walls of the tube and force the excess metal of the inner wall of the tube adjacent the block into the recessed portion so that the expanded tube is unconstricted at the bend.

5. The method of making a heat exchanger core tube which comprises the steps of folding a flat metallic strip to bring the longitudinal edges together, joining the edges to produce a substantially collapsed fluid-tight tube, disposing the said collapsed tube in a serpentine path about a plurality of die blocks with the joined edges at the lateral extremity of the tube, the die blocks at the bends each having a relatively deep recessed portion adjacent the bend made by the tube in passing about the outer extremity thereof, and then expanding the tube by fluid pressure to separate the walls of the tube and force the excess metal of the inner wall of the tube adjacent the blocks into the recessed portions thereof so that the expanded tube is unconstricted at the bend.

6. The method of making a heat exchanger core tube which comprises the steps of folding a metal sheet lengthwise and bringing the two opposite edges thereof near to each other, permanently securing together opposed portions of the sheet adjacent to said edges to form a substantially flat tubular body, disposing in predetermined space relation a plurality of generally rectangular die blocks having relatively deep recesses across their corner portions, threading the tubular body into a serpentine configuration through the resulting die block assembly with the seamed edges at the lateral edges of the tube introducing fluid under pressure into said body and thereby expanding the body to simultaneously move the flat sides of the body into engagement with opposing side walls of adjacent die blocks and to move the excess portion of the inner wall of the body at each bend away from the opposing outer wall portion and into the recessed portions thereof so that the expanded tube is unconstricted at the bend.

7. The method of making a heat exchanger core tube which comprises the steps of forming from sheet metal a flat substantially collapsed fluid-tight tube having a seam at a lateral extremity thereof, bending the tube about a line passing through the lateral extremities thereof, and disposing the bent tube about a die block having a relatively deep recessed portion adjacent the place where the tube is bent, and then expanding the tube by fluid under pressure to separate the walls of the tube and force the excess metal of the inner wall of the tube adjacent the block into the recessed portion so that the expanded tube is unconstricted at the bend.

8. The method of making a heat exchanger core tube which comprises the steps of forming from sheet metal a flat substantially collapsed fluid-tight tube having a seam at a lateral extremity thereof, disposing the said collapsed tube in a serpentine path about a plurality of die blocks, the die blocks at the bends each having a relatively deep recessed portion, and then expanding the tube to separate the walls of the tube and to force the excess metal of the tube at the inner walls of the bends adjacent the blocks into the recessed portions so that the expanded tube is unconstricted at the bends.

9. The method of making a heat exchanger core tube which comprises the steps of bringing the opposed edges of a metallic strip together, joining the edges to produce a substantially collapsed fluid-tight tube, bending two spaced portions of the tube through substantially 180° about a line passing through the longitudinal center line of the tube, and disposing the tube about two spaced die blocks, the die blocks at the bends each having a relatively deep recessed portion adjacent the bend made by the tube in passing about the outer extremity thereof, and then expanding the tube by fluid pressure to separate the walls of the tube and force the excess metal of the inner wall of the tube adjacent the blocks into the recessed portions thereof so that the expanded tube is unconstricted at the bends.

10. The method of making a heat exchanger core tube which comprises the steps of bringing the opposed edges of a metallic strip together, joining the edges to produce a substantially collapsed fluid-tight tube, bending two spaced portions of the tube through substantially 90° about a line passing through the longitudinal center line of the tube, and disposing the bent tube about a die block having relatively deep recessed portions adjacent the places where the tube is bent, and then expanding the tube by fluid pressure to separate the walls of the tube and force the excess metal of the inner wall of the tube adjacent the blocks into the recessed portions thereof so that the expanded tube is unconstricted at the bends.

SAMUEL H. SMITH.

References Cited in the file of this patent

UNITED STATES PATENTS

| Number | Name | Date |
| --- | --- | --- |
| 169,392 | Wicks | Nov. 2, 1875 |
| 528,661 | Engel | Nov. 6, 1894 |
| 588,804 | Parish | Aug. 24, 1897 |
| 731,124 | Park | June 16, 1903 |
| 1,177,240 | Gates | Mar. 28, 1916 |
| 1,420,917 | Elliott | June 27, 1922 |
| 1,542,983 | Bergmann | June 23, 1925 |
| 1,683,123 | Bergmann | Sept. 4, 1928 |
| 1,779,911 | Litle, Jr. | Oct. 28, 1930 |
| 1,992,835 | Newman | Feb. 26, 1935 |
| 2,009,863 | Trane | July 30, 1935 |
| 2,092,170 | Kritzer | Sept. 7, 1937 |
| 2,097,851 | Wenzl | Nov. 2, 1937 |
| 2,129,300 | Bichowsky | Sept. 6, 1938 |
| 2,164,005 | Booth | June 27, 1939 |
| 2,238,037 | Cornell | Apr. 15, 1941 |
| 2,306,526 | Dalzell et al. | Dec. 29, 1942 |
| 2,507,094 | Collins | May 9, 1950 |
| 2,567,515 | Janik | Sept. 11, 1951 |